(12) United States Patent
Ginter et al.

(10) Patent No.: US 9,920,714 B2
(45) Date of Patent: Mar. 20, 2018

(54) METHOD FOR CONTROLLING IGNITION IN INTERNAL COMBUSTION ENGINE AND PRE-CHAMBER ASSEMBLY THEREOF

(71) Applicant: Caterpillar Inc., Peoria, IL (US)

(72) Inventors: David M. Ginter, Commerce Township, MI (US); Sai Keat Paul Wang, Peoria Heights, IL (US); Charlie C. Kim, Dunlap, IL (US); Arnold M. Kim, Peoria, IL (US); Daniel G. Van Alstine, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/197,027

(22) Filed: Jun. 29, 2016

(65) Prior Publication Data

US 2018/0003132 A1    Jan. 4, 2018

(51) Int. Cl.
| | | |
|---|---|---|
| *F02B 51/00* | (2006.01) | |
| *F02B 19/00* | (2006.01) | |
| *F02B 47/00* | (2006.01) | |
| *F02M 25/03* | (2006.01) | |
| *F02B 19/12* | (2006.01) | |
| *F02M 26/35* | (2016.01) | |
| *F02M 27/04* | (2006.01) | |

(52) U.S. Cl.
CPC ............. *F02M 25/03* (2013.01); *F02B 19/12* (2013.01); *F02M 26/35* (2016.02); *F02M 27/04* (2013.01)

(58) Field of Classification Search
CPC ........ F02M 25/03; F02M 25/10; F02M 27/04; F02M 26/35; F02M 2700/4321; F02M 57/06; F02B 19/10; F02B 47/02; F02B 47/06; F02B 47/10; F02B 2043/106
USPC .......... 123/25 A, 25 B, 25 C, 297, 536, 260, 123/261, DIG. 12
See application file for complete search history.

(56) References Cited

U.S. PATENT DOCUMENTS

| | | | |
|---|---|---|---|
| 3,958,539 A | * | 5/1976 | Satow ..................... F02B 53/04 123/208 |
| 4,271,793 A | | 6/1981 | Valdespino |
| 8,925,518 B1 | | 1/2015 | Riley et al. |

(Continued)

FOREIGN PATENT DOCUMENTS

DE         10356192         7/2005

*Primary Examiner* — Hai Huynh

(57) ABSTRACT

An internal combustion engine is provided. The internal combustion engine includes an engine block having at least one cylinder. The internal combustion engine includes a cylinder head engaged with the engine block. The internal combustion engine includes a pre-chamber assembly associated with the cylinder head. The pre-chamber assembly includes a pre-chamber in fluid communication with a main combustion chamber. The pre-chamber assembly includes a fuel supply unit in fluid communication with the pre-chamber to selectively supply fuel to the pre-chamber. The pre-chamber assembly includes an auxiliary unit configured to produce oxygen and hydrogen. The auxiliary unit is in fluid communication with the pre-chamber to supply oxygen to the pre-chamber and in fluid communication with the main combustion chamber to supply hydrogen to the main combustion chamber. The pre-chamber assembly includes an ignition unit associated with the pre-chamber to selectively ignite a mixture of fuel and oxygen in the pre-chamber.

18 Claims, 4 Drawing Sheets

(56) References Cited

U.S. PATENT DOCUMENTS

| | | | | |
|---|---|---|---|---|
| 9,482,192 | B2* | 11/2016 | Kim | F02M 25/14 |
| 2008/0223332 | A1* | 9/2008 | Maro | F02B 43/10 |
| | | | | 123/25 R |
| 2009/0193781 | A1* | 8/2009 | Haase | C01B 3/001 |
| | | | | 60/39.12 |
| 2011/0108000 | A1* | 5/2011 | Williams | F02M 25/03 |
| | | | | 123/25 C |
| 2011/0256052 | A1* | 10/2011 | Merritt | C01B 3/10 |
| | | | | 423/658 |
| 2015/0260131 | A1* | 9/2015 | Riley | F02M 31/20 |
| | | | | 123/253 |
| 2016/0195007 | A1* | 7/2016 | Kim | F02B 43/10 |
| | | | | 123/254 |
| 2017/0306917 | A1* | 10/2017 | Kim | F02P 17/02 |

* cited by examiner

METHOD FOR CONTROLLING IGNITION IN INTERNAL COMBUSTION ENGINE AND PRE-CHAMBER ASSEMBLY THEREOF

TECHNICAL FIELD

The present disclosure relates to internal combustion engines, and more particularly relates to a system and a method for controlling ignition in an internal combustion engine.

BACKGROUND

Internal combustion engines are often equipped with a pre-combustion chamber or a pre-chamber to help achieve proper burning of fuel. A pre-chamber is a relatively small gas accommodating cavity in fluid communication with a combustion chamber of the internal combustion engine. The pre-chamber helps initiate ignition of gaseous fuels in the combustion chamber of the internal combustion engine. The pre-chamber is in communication with the combustion chamber via a set of orifices. Typically, the pre-chamber receives gaseous fuel through inlet valves and the fuel mixes with air in the pre-chamber to form a mixture of fuel and air. An ignition device, such as a spark plug, associated with the pre-chamber ignites the mixture of the fuel and air. Ignition of the mixture of the fuel and air creates a flame front of burning fuel in the pre-chamber, and the flame front is propagated into the combustion chamber through the orifices. A quality of such ignition depends largely upon richness of fuel and air ratio in the mixture. Therefore, in internal combustion engines designed to work with very dilute fuel and air mixture, often a poor quality of ignition takes places. Further, in internal combustion engines having a high amount of EGR (Exhaust Gas Recirculation), the supplied fuel and the air mixture becomes dilute, resulting in poor quality of ignition.

For reference, U.S. Pat. No. 4,271,793 relates to an improvement to an internal combustion engine having a fuel system for feeding a fuel-air mixture to the combustion chambers and an electrical generation system, such as an alternator. An electrolytic cell is attached adjacent to the engine to generate hydrogen and oxygen upon the application of a voltage between the cathode and anode of the electrolytic cell. The gas feed connects the electrolytic cell to the engine fuel system for feeding the hydrogen and oxygen to the engine combustion chambers.

SUMMARY OF THE DISCLOSURE

In one aspect of the present disclosure, a pre-chamber assembly for an internal combustion engine is provided. The pre-chamber assembly includes a pre-chamber in fluid communication with a main combustion chamber of the internal combustion engine. The pre-chamber assembly also includes a fuel supply unit in fluid communication with the pre-chamber. The fuel supply unit is configured to selectively supply fuel to the pre-chamber. The pre-chamber assembly includes an auxiliary unit in fluid communication with the pre-chamber. The auxiliary unit is configured to supply oxygen to the pre-chamber. The pre-chamber assembly also includes an ignition unit associated with the pre-chamber. The ignition unit is configured to ignite the mixture in the pre-chamber which has been augmented with fuel and oxygen.

In another aspect of the present disclosure, an internal combustion engine is provided. The internal combustion engine includes an engine block having at least one cylinder. The internal combustion engine also includes a cylinder head engaged with the engine block to cover the at least one cylinder and define a main combustion chamber. The internal combustion engine further includes a pre-chamber assembly associated with the cylinder head. The pre-chamber assembly includes a pre-chamber in fluid communication with the main combustion chamber. The pre-chamber assembly also includes a fuel supply unit in fluid communication with the pre-chamber to selectively supply fuel to the pre-chamber. The pre-chamber assembly also includes an auxiliary unit configured to produce oxygen and hydrogen. The auxiliary unit is in fluid communication with the pre-chamber to supply oxygen to the pre-chamber. The auxiliary unit is also in fluid communication with the main combustion chamber to supply hydrogen to the main combustion chamber. The pre-chamber assembly further includes an ignition unit associated with the pre-chamber to ignite the mixture in the pre-chamber which has been augmented with fuel and oxygen In yet another aspect of the present disclosure, a method of operating an internal combustion engine is provided. The method includes producing oxygen and hydrogen from water. The method also includes supplying oxygen to a pre-chamber of the internal combustion engine. The method also includes supplying hydrogen to a main combustion chamber of the internal combustion engine. The method also includes supplying fuel to the pre-chamber of the internal combustion engine. The method also includes forming a mixture of fuel and oxygen in the pre-chamber. Further, the method includes ignite the mixture in the pre-chamber which has been augmented with fuel and oxygen.

Other features and aspects of this disclosure will be apparent from the following description and the accompanying drawings.

DETAILED DESCRIPTION

Figure 1:
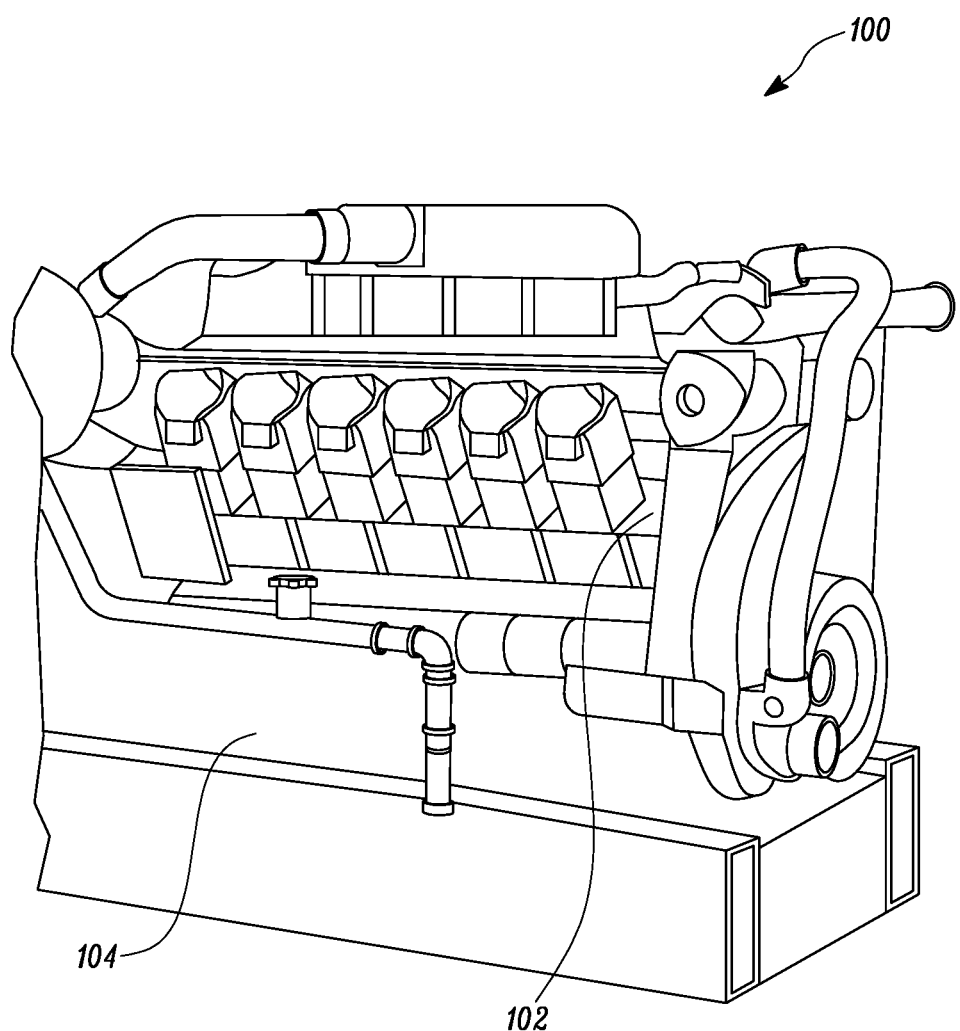
FIG. 1 is a schematic block diagram of an internal combustion engine.

Wherever possible, the same reference numbers will be used throughout the drawings to refer to the same or the like parts. FIG. 1 illustrates a perspective view of an exemplary internal combustion engine 100, according to one embodiment of the present disclosure. The internal combustion engine 100 may be one of a gas engine, a dual fuel engine, a homogenous charge compression ignition engine or any other type of spark ignited engine or compression engine. The internal combustion engine 100 may be powered by gaseous fuel including, but not limited to, natural gas, petroleum gas, coal gas, mine gas, landfill gas, and sewage gas. In one example, the internal combustion engine 100 is a gaseous fuel based reciprocating spark-ignited engine.

The internal combustion engine 100 can be of a single-cylinder type engine, or a multi cylinder type engine (as shown). In the illustrated embodiment, the internal combustion engine 100 is a V-type multi-cylinder engine, however, it will be appreciated that the embodiments described herein may be used in any suitable configuration of the internal combustion engine 100, including, but not limited to, inline, radial, and rotary. The internal combustion engine 100 may be utilized for any suitable application, such as motor vehicles, work machines, locomotives or marine engines, and in stationary applications such as electrical power generators. The internal combustion engine 100 includes a cylinder head 102 and an engine block 104 on which the cylinder head 102 is positioned.

Figure 2:
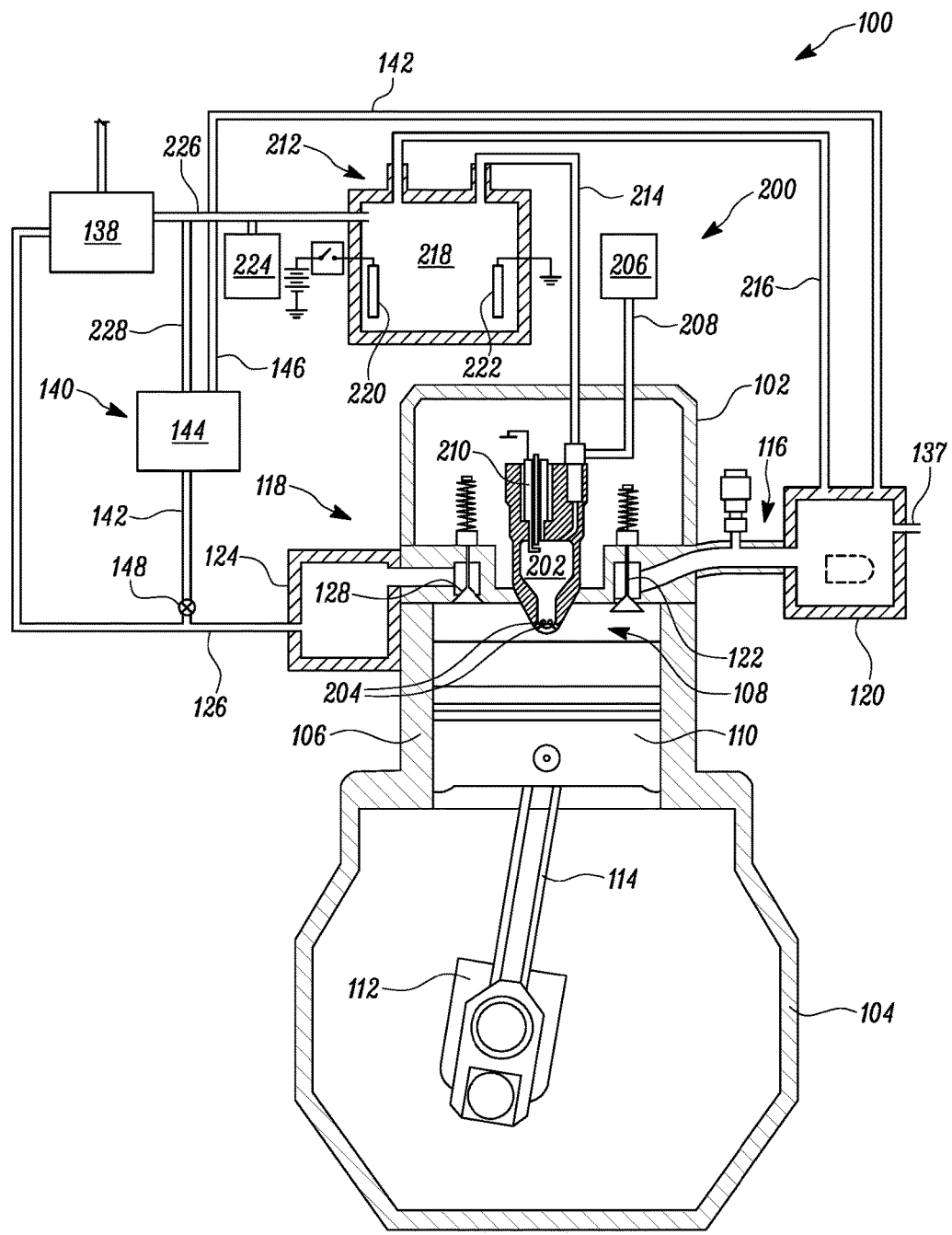
FIG. 2 is a schematic diagram of a pre-chamber assembly for the internal combustion engine, according to an embodiment of the present disclosure.
Figure 3:
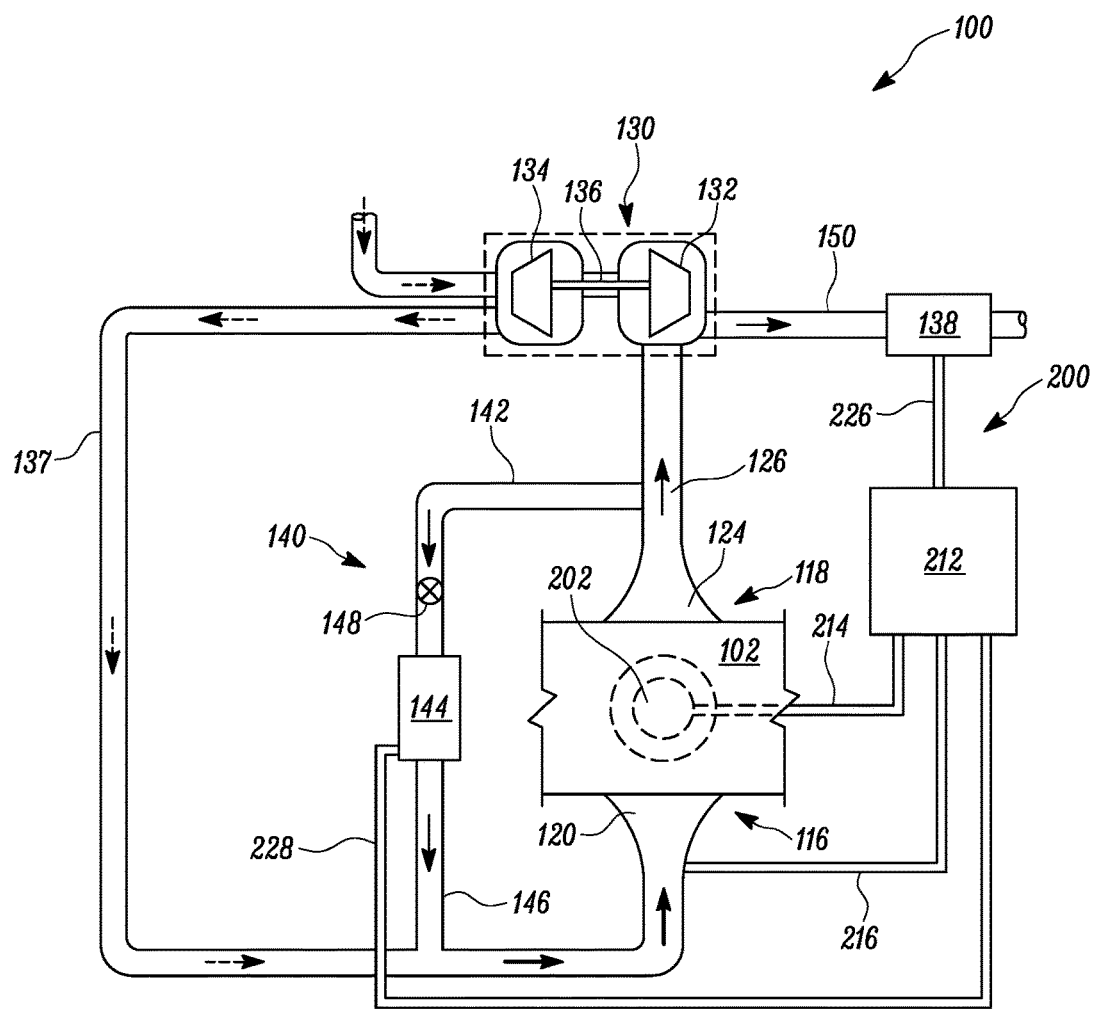
FIG. 3 is a schematic block diagram of a pre-chamber assembly for the internal combustion engine, according to another embodiment of the present disclosure.

For explanatory purposes, a sectional view of the internal combustion engine 100 illustrating a single cylinder 106 is shown in FIG. 2 and a schematic view of the internal combustion engine 100 is shown in FIG. 3. Referring to FIG. 2 and FIG. 3, the engine block 104 of the internal combustion engine 100 may include at least one cylinder, such as the cylinder 106 (shown in FIG. 2). The cylinder 106 includes a main combustion chamber 108. The cylinder head 102 is engaged with the engine block 104 to cover the cylinder 106 and define the main combustion chamber 108. A piston 110 is provided within the cylinder 106. The piston 110 is connected to a crankshaft 112 and is configured to reciprocate within the cylinder 106. A connecting rod 114 may connect the piston 110 to the crankshaft 112 such that a sliding motion of the piston 110 within the cylinder 106 causes a rotation of the crankshaft 112.

The internal combustion engine 100 further includes an intake system 116 and an exhaust system 118. The intake system 116 includes an intake manifold 120 attached to the engine block 104 such that the intake manifold 120 extends over or is proximate to each cylinders 106. Charge air is supplied to the cylinder 106 through the intake manifold 120. In an embodiment, the term "charge air" may be understood as air. In another embodiment, the charge air may include a mixture of fuel and air. Further, one or more intake valves, such as an intake valve 122, are provided to control flow of the charge air to the cylinder 106 through the intake manifold 120.

Exhaust gases formed due to combustion of the charge air are allowed to escape the main combustion chamber 108 of the cylinder 106 through the exhaust system 118. The exhaust system 118 includes an exhaust manifold 124 coupled to the engine block 104 to receive the exhaust gases from each cylinders, such as the cylinder 106. The exhaust system 118 further includes an exhaust pipe 126 connected to the exhaust manifold 124 for receiving the exhaust gases and communicating the exhaust gases to environment either directly or after processing through an after-treatment system (not shown). One or more exhaust valves, such as an exhaust valve 128 is provided to control exit of the exhaust gases from the exhaust manifold 124 to the exhaust pipe 126.

In an embodiment, the exhaust system 118 may also include a turbocharger 130 (shown in FIG. 3) in fluid communication with the exhaust manifold 124. The turbocharger 130 supplies compressed air to the intake manifold 120. The turbocharger 130 may include a turbine 132 in fluid communication with the exhaust manifold 124, and a compressor 134 in fluid communication with the intake manifold 120. The turbine 132 is mechanically coupled to the compressor 134 via a shaft 136. The turbine 132 receives the exhaust gases from the exhaust manifold 124 through the exhaust pipe 126 such that a rotation of the turbine 132 causes a corresponding rotation of the compressor 134. In particular, the exhaust gases received through the exhaust pipe 126 flow through the turbine 132 to cause a rotational motion of the turbine 132, which in turn causes a corresponding rotational motion of the compressor 134. The compressor 134 further increases a pressure of the intake air before being supplied to the intake manifold 120, via an intake pipe 137.

As illustrated in FIGS. 2 and 3, the internal combustion engine 100 further includes a pre-chamber assembly 200. The pre-chamber assembly 200 is associated with the cylinder head 102 of the internal combustion engine 100. The pre-chamber assembly 200 facilitates combustion of charge air in the main combustion chamber 108. The pre-chamber assembly 200 includes a pre-chamber 202. The pre-chamber 202 may be in a form of a cavity in fluid communication with the main combustion chamber 108. A set of orifices 204 of the pre-chamber assembly 200 communicate the pre-chamber 202 with the main combustion chamber 108.

The pre-chamber assembly 200 also includes a fuel supply unit 206 (shown in FIG. 3) in fluid communication with the pre-chamber 202. The fuel supply unit 206 selectively supplies fuel to the pre-chamber 202, via a fuel conduit 208. In an embodiment, the fuel supply unit 206 may include a fuel reservoir (not shown) and a pump element (not shown) adapted to transfer the fuel from a fluid reservoir to the pre-chamber 202. An injector and/or a valve element may also be included with the fuel supply unit 206 in order to control supply of fuel to the pre-chamber 202.

In order to ignite fuel in the pre-chamber 202, an ignition unit 210 is also associated with the pre-chamber 202. In an embodiment, the ignition unit 210 may include multiple spark plugs associated with the pre-chamber assembly 200. It should be noted that the ignition unit 210 may include any other ignition device such as a laser ignition device, without any limitations. The ignition unit 210 ignites fuel received from the dilute main combustion chamber fuel-air mixture and from the fuel supply unit 206 in the presence of oxygen supplied from the electrolysis unit. The ignited gases pass through the set of orifices 204 and are introduced in the main combustion chamber 108 to ignite charge air present in the main combustion chamber 108.

Further, an auxiliary unit 212 is associated with the pre-chamber assembly 200 to supply oxygen to the pre-chamber 202. Specifically, the auxiliary unit 212 is in fluid communication with the pre-chamber 202 of the pre-chamber assembly 200 through a first auxiliary conduit 214. The auxiliary unit 212 is configured to produce and supply oxygen to the pre-chamber 202 for combustion of fuel therein. In an embodiment, oxygen produced by the auxiliary unit 212 is allowed to mix with fuel supplied by the fuel supply unit 206 before entering the pre-chamber 202. In another embodiment of the present disclosure, oxygen may be directly supplied to the pre-chamber 202 to mix with fuel in the pre-chamber 202.

The auxiliary unit 212 is also in fluid communication with the main combustion chamber 108 of the internal combustion engine 100. The auxiliary unit 212 supplies hydrogen, produced along with oxygen, to the main combustion chamber 108. In an embodiment, the auxiliary unit 212 supplies hydrogen to the main combustion chamber 108 through a second auxiliary conduit 216 connected to the intake manifold 120. In various other embodiments, the auxiliary unit 212 may be configured to supply hydrogen directly to the main combustion chamber 108 through any other conduit (not illustrated).

The auxiliary unit 212, in various embodiments of the present disclosure, may be configured to produce and dispense oxygen ($O_2$) and hydrogen ($H_2$). In an embodiment, the auxiliary unit 212 may be an electrolysis unit. In another embodiment, the auxiliary unit 212 may be a membrane filtration system. In yet another embodiment, the auxiliary unit 212 may be independent reservoirs of oxygen ($O_2$) and hydrogen ($H_2$).

Referring to FIG. 2, the auxiliary unit 212 is the electrolysis unit, according to an embodiment of the present disclosure. The auxiliary unit 212 produces oxygen ($O_2$) and hydrogen ($H_2$) from electrolysis of water ($H_2O$). The auxiliary unit 212 includes an electrolysis chamber 218 (also referred to as an electrolysis cell), and a pair of electrodes, such as a first electrode 220, and a second electrode 222. The electrolysis chamber 218 may be made out of metallic, ceramic or any other material known in the art. The first electrode 220 and the second electrode 222 may be made out of a suitable non-reactive or non-corrosive material, such as platinum or carbon. A voltage may be applied to the first electrode 220 from a battery (not illustrated) or an alternator (not illustrated) powered by the internal combustion engine 100. The second electrode 222 may be at a negative potential or ground potential. As such, a potential difference may be obtained between the first electrode 220 and the second electrode 222.

The electrolysis chamber 218 stores a predefined quantity of sulfuric acid and water therein. In an embodiment of FIG. 2, a water source 224, for example a water tank, is provided in fluid communication with the auxiliary unit 212, and the electrolysis chamber 218 of the auxiliary unit 212 receives water for electrolysis from the water source 224. In an example, the auxiliary unit 212 uses electric current generated due to the potential difference between the first and second electrodes 220, 222 to electrolyze water into hydrogen and oxygen, according to the following formula:

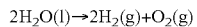

$$2H_2O(l) \rightarrow 2H_2(g) + O_2(g)$$

Oxygen thus produced, travels through the first auxiliary conduit 214 to enter the pre-chamber 202 and hydrogen travels through the second auxiliary conduit 216 to enter the intake manifold 120. It may herein be noted that above provided formula is merely an example which shall not be construed as limiting and the auxiliary unit 212 may be configured to produce oxygen and hydrogen from electrolysis using any other reaction.

Referring to FIG. 3, the auxiliary unit 212 is a membrane separation system, according to another embodiment of the present disclosure. The membrane separation system is configured to dissociate oxygen ($O_2$) and hydrogen ($H_2$) from water ($H_2O$). In an embodiment, the auxiliary unit 212 may include a plurality of membranes, and a pair of electrodes electrically connected across the membranes. When the water flows through the membranes, hydrogen and oxygen are dissociated from the water. Oxygen thus produced travels through the first auxiliary conduit 214 to enter the pre-chamber 202 and the hydrogen travels through the second auxiliary conduit 216 to enter the intake manifold 120.

Referring to FIGS. 2 and 3, the auxiliary unit 212 is also in fluid communication with the exhaust system 118 of the internal combustion engine 100. The exhaust system 118, as shown in FIGS. 2 and 3, includes a first condensation unit 138 in fluid communication with the electrolysis chamber 218 of the auxiliary unit 212. In an embodiment of FIG. 2, the first condensation unit 138 is disposed in the exhaust pipe 126 and receives exhaust gases from the exhaust pipe 126. In an embodiment of FIG. 3, the first condensation unit 138 is disposed downstream of the turbine 132 of the turbocharger 130 in an outlet pipe 150 of the engine 100.

The first condensation unit 138 is further configured to separate water from the exhaust gases received through the exhaust pipe 126 and transfer remaining exhaust gases to environment either directly or after processing through an after-treatment system (not shown). For example, the first condensation unit 138 may include a plurality of heat exchanging units configured to condense water vapors present in the exhaust gases into liquid form. In an embodiment of FIG. 2, water separated from the exhaust gases by the first condensation unit 138 is supplied to the water source 224, via a first water conduit 226, before water is supplied to the auxiliary unit 212. In an embodiment of FIG. 3, the water separated from the exhaust gases by the first condensation unit 138 may be directly supplied to the electrolysis chamber 218 of the auxiliary unit 212, via the first water conduit 226.

In various embodiments, the exhaust system 118 of the internal combustion engine 100 may additionally include an Exhaust Gas Recirculation (EGR) system 140. As illustrated in FIGS. 2 and 3, the EGR system 140 includes an EGR inlet pipe 142, a second condensation unit 144, and an EGR outlet pipe 146. The EGR inlet pipe 142 connects the second condensation unit 144 with the exhaust pipe 126 and the EGR outlet pipe 146 connects the second condensation unit 144 with the intake manifold 120. A predefined volume of exhaust gases is received by the EGR inlet pipe 142 from the exhaust pipe 126 of the exhaust system 118 through an EGR valve 148, and is communicated to the second condensation unit 144.

The second condensation unit 144 is configured to separate water from the exhaust gases received through the EGR inlet pipe 142 and transfer remaining exhaust gases to the intake manifold 120 through the EGR outlet pipe 146. For example, the second condensation unit 144 may include a plurality of heat exchanging units configured to condense water vapors present in exhaust gases into liquid form. In an embodiment of FIG. 2, the water separated from the exhaust gases in the second condensation unit 144 is supplied to the water source 224, via a second water conduit 228, before the water is supplied to the auxiliary unit 212. In an embodiment of FIG. 3, the water separated from the exhaust gases in the second condensation unit 144 is directly supplied to the auxiliary unit 212, via the second water conduit 228.

INDUSTRIAL APPLICABILITY

Embodiments of the present disclosure have applicability in use and implementation in any internal combustion engine 100 for optimizing combustion of fuel in the internal combustion engine 100. The auxiliary unit 212 of the pre-chamber assembly 200 is configured to produce oxygen and hydrogen. Oxygen produced in the auxiliary unit 212 is supplied to the pre-chamber 202 for ignition of fuel in the pre-chamber 202. Due to combustion of fuel in presence of oxygen, higher energy density is obtained due to increased molecular interaction between oxygen and fuel. Further, hydrogen produced in the auxiliary unit 212 is supplied to the main combustion chamber 108. Presence of hydrogen in charge air substantially increases a reactivity of the charge air, thereby effectively burning fuel in the main combustion chamber 108.

Figure 4:
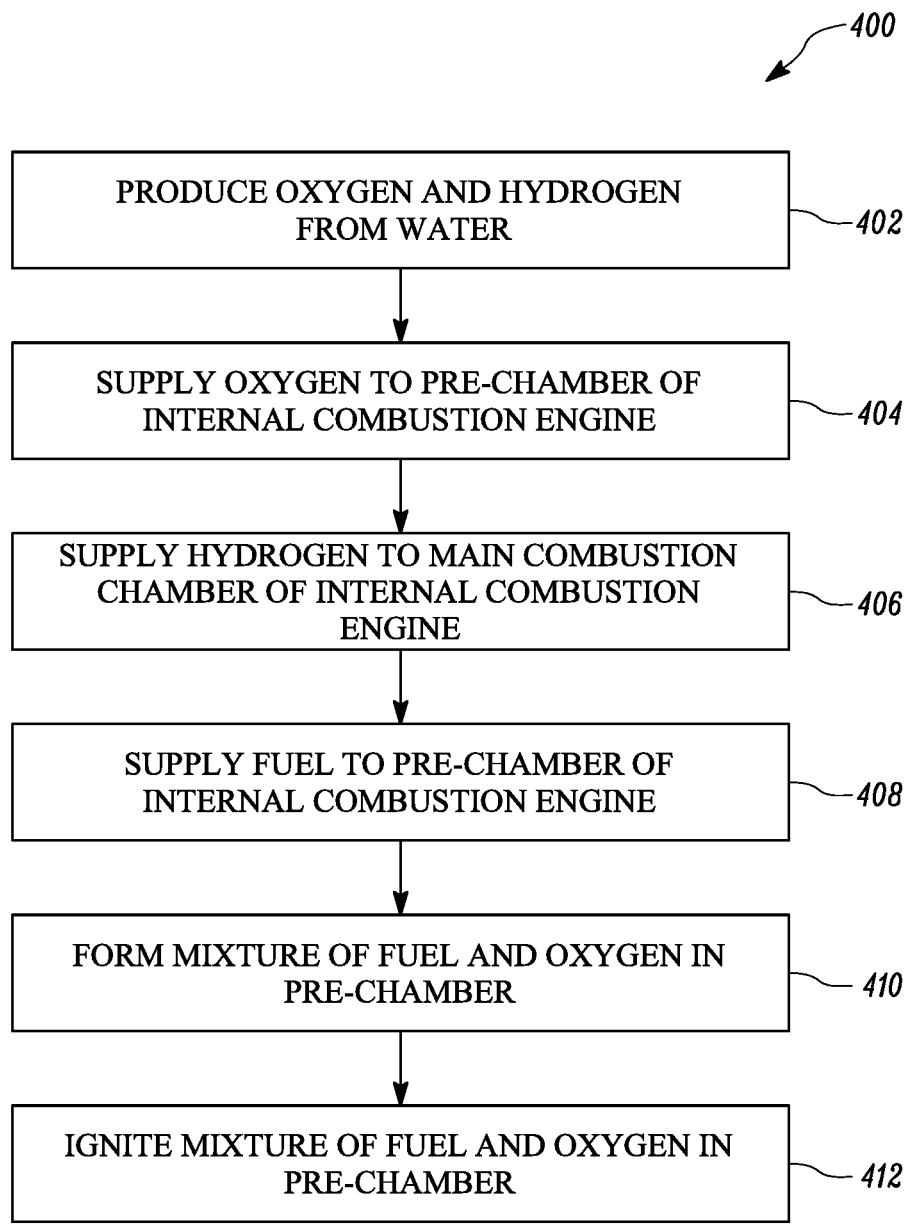
FIG. 4 is a flowchart of a method of operating an internal combustion engine, according to an embodiment of the present disclosure.

FIG. 4 is a flowchart for a method 400 of operating the internal combustion engine 100, according to an embodiment of the present disclosure. For purposes of the present disclosure, embodiments disclosed in conjunction with FIGS. 1 to 3 may be considered as being pursuant to the method 400. Therefore, for the sake of brevity, the aspects of the present disclosure which are already explained in detail in the description of FIG. 1, FIG. 2, and FIG. 3 are not explained in detail with regard to the description of the method 400.

At step 402, the method 400 includes producing oxygen and hydrogen from water. In one embodiment, the auxiliary unit 212 may be configured to produce oxygen and hydrogen. In one embodiment, the auxiliary unit 212 may be the electrolysis unit configured to produce oxygen and hydrogen from the water via electrolysis of water. In another embodiment, the auxiliary unit 212 may be the membrane filtration system configured to obtain oxygen and hydrogen from the water via membrane filtration. The auxiliary unit 212 receives water from the first condensation unit 138 of the exhaust system 118 and the second condensation unit 144 of the EGR system 140 in order to produce oxygen and hydrogen from the water.

At step 404, the method 400 includes supplying oxygen to the pre-chamber 202 of the internal combustion engine 100. Oxygen produced from the water is supplied to the pre-chamber 202 through the water source 224. In another embodiment, the oxygen from the auxiliary unit 212 may be directly supplied to the pre-chamber 202 through the first auxiliary conduit 214.

At step 406, the method 400 includes supplying hydrogen to the main combustion chamber 108 of the internal combustion engine 100. Hydrogen produced the auxiliary unit 212 is supplied to the main combustion chamber 108. In an embodiment, hydrogen may be supplied from the auxiliary unit 212 to the main combustion chamber 108 through the second auxiliary conduit 216 connected to the intake manifold 120. In another embodiment, hydrogen may be supplied directly to the main combustion chamber 108 through any other conduit. In yet another embodiment, hydrogen produced in the auxiliary unit 212 may be supplied to the EGR system 140.

At step 408, the method 400 includes supplying fuel to the pre-chamber 202 of the internal combustion engine 100. The fuel supply unit 206 selectively supplies fuel to the pre-chamber 202 through the fuel conduit 208. At step 410, the method 400 also includes forming mixture of fuel and oxygen in the pre-chamber 202. In an embodiment, the fuel supplied by the fuel supply unit 206 may be mixed with the oxygen before being supplied to the pre-chamber 202. In another embodiment, the fuel supplied by the fuel supply unit 206 may be directly supplied with oxygen in the pre-chamber 202.

At step 412, the method 400 further includes igniting mixture of fuel and oxygen in the pre-chamber 202. The ignition unit 210 of the pre-chamber assembly 200 is configured to ignite the mixture of fuel and oxygen. Specifically, fuel received from the fuel supply unit 206 is ignited by the ignition unit 210 in the presence of oxygen received from the auxiliary unit 212.

With the use and implementation of the pre-chamber assembly 200 and the method 400, thermal losses of the internal combustion engine 100 may be reduced as fuel is first combusted in presence of oxygen in the pre-chamber 202 and the charge air is combusted in the main combustion chamber 108 by the flame front generated in the pre-chamber 202. Emissions of the internal combustion engine 100 are also reduced due to increased molecular interaction between fuel and oxygen. Therefore, an overall running time of the internal combustion engine 100 may be increased, which may lead to a reduced overall cost of the internal combustion engine 100.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A pre-chamber assembly for an internal combustion engine, the pre-chamber assembly comprising:
   a pre-chamber in fluid communication with a main combustion chamber of the internal combustion engine;
   a fuel supply unit in fluid communication with the pre-chamber, the fuel supply unit being configured to selectively supply fuel to the pre-chamber;
   an auxiliary unit in fluid communication with the pre-chamber and the main combustion chamber, the auxiliary unit being configured to produce oxygen and hydrogen and to supply oxygen to the pre-chamber and supply hydrogen to the main combustion chamber; and
   an ignition unit associated with the pre-chamber and configured to selectively ignite a mixture of fuel and oxygen in the pre-chamber.

2. The pre-chamber assembly of claim 1, wherein the auxiliary unit includes an electrolysis unit configured to produce oxygen and hydrogen through electrolysis of water.

3. The pre-chamber assembly of claim 2, wherein the auxiliary unit is in fluid communication with a water source.

4. The pre-chamber assembly of claim 3, wherein the water source is an exhaust system.

5. The pre-chamber assembly of claim 4, wherein the auxiliary unit receives water resulting from condensation of exhaust gases by the exhaust system.

6. The pre-chamber assembly of claim 3, wherein the water source is an Exhaust Gas Recirculation (EGR) system.

7. The pre-chamber assembly of claim 1, wherein the auxiliary unit includes a membrane filtration system configured to obtain oxygen and hydrogen from water.

8. An internal combustion engine comprising:
   an engine block having at least one cylinder;
   a cylinder head engaged with the engine block to cover the at least one cylinder and define a main combustion chamber; and
   a pre-chamber assembly associated with the cylinder head, the pre-chamber assembly comprising:
      a pre-chamber in fluid communication with the main combustion chamber;
      a fuel supply unit in fluid communication with the pre-chamber to selectively supply fuel to the pre-chamber;
      an auxiliary unit configured to produce oxygen and hydrogen, the auxiliary unit being in fluid communication with the pre-chamber to supply oxygen to the pre-chamber, and with the main combustion chamber to supply hydrogen to the main combustion chamber; and
      an ignition unit associated with the pre-chamber to selectively ignite a mixture of fuel and oxygen in the pre-chamber.

9. The internal combustion engine of claim 8, wherein the auxiliary unit includes an electrolysis unit configured to produce oxygen and hydrogen through electrolysis of water.

10. The internal combustion engine of claim 8, wherein the auxiliary unit is in fluid communication with a water source.

11. The internal combustion engine of claim 10, wherein the water source is an exhaust system, the auxiliary unit receives water resulting from condensation of exhaust gases by the exhaust system.

12. The internal combustion engine of claim 10, wherein the auxiliary unit is in fluid communication with an Exhaust Gas Recirculation (EGR) system to receive water from the Exhaust Gas Recirculation (EGR) system.

13. The internal combustion engine of claim 10, wherein the auxiliary unit includes a membrane filtration system configured to obtain oxygen and hydrogen from water.

14. A method of operating an internal combustion engine, the method comprising:
 producing oxygen and hydrogen from water;
 supplying oxygen to a pre-chamber of the internal combustion engine;
 supplying hydrogen to a main combustion chamber of the internal combustion engine;
 supplying fuel to the pre-chamber of the internal combustion engine;
 forming a mixture of fuel and oxygen in the pre-chamber; and
 igniting the mixture of fuel and oxygen in the pre-chamber.

15. The method of claim 14 further comprising, obtaining oxygen and hydrogen from the water via electrolysis of water.

16. The method of claim 14 further comprising, separating oxygen and hydrogen from the water via membrane filtration.

17. The method of claim 14 further comprising, receiving water from an exhaust system for producing oxygen and hydrogen.

18. The method of claim 14 further comprising, receiving water from an Exhaust Gas Recirculation (EGR) system for producing oxygen and hydrogen.

* * * * *